(12) United States Patent
Smith et al.

(10) Patent No.: US 10,085,117 B2
(45) Date of Patent: Sep. 25, 2018

(54) METHODS AND APPARATUS FOR ALTITUDE-BASED GEOFENCING

(71) Applicant: ECHOSTAR TECHNOLOGIES L.L.C., Englewood, CO (US)

(72) Inventors: Michael Smith, Canton, GA (US); Manase Xiong, Englewood, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/379,779

(22) Filed: Dec. 15, 2016

(65) Prior Publication Data

US 2018/0176724 A1   Jun. 21, 2018

(51) Int. Cl.
*H04W 4/021* (2018.01)
*H04W 4/02* (2018.01)
*H04W 4/00* (2018.01)
*H04W 4/80* (2018.01)

(52) U.S. Cl.
CPC ............ *H04W 4/021* (2013.01); *H04W 4/008* (2013.01); *H04W 4/027* (2013.01); *H04W 4/80* (2018.02)

(58) Field of Classification Search
CPC ...... H04W 4/021; H04W 4/008; H04W 4/027
See application file for complete search history.

(56) References Cited

U.S. PATENT DOCUMENTS

| | | | | |
|---|---|---|---|---|
| 8,463,297 | B2 * | 6/2013 | Bull | H04W 48/04 455/404.1 |
| 2011/0306304 | A1 * | 12/2011 | Forutanpour | G06F 3/04883 455/67.11 |
| 2014/0273924 | A1 * | 9/2014 | Hyde | H04W 4/02 455/405 |
| 2015/0332325 | A1 * | 11/2015 | Sharma | G06Q 30/02 705/14.57 |
| 2016/0035096 | A1 * | 2/2016 | Rudow | G01S 19/25 348/135 |
| 2017/0010104 | A1 * | 1/2017 | Aviel | G01C 21/32 |
| 2017/0018184 | A1 * | 1/2017 | Northrup | G08G 1/144 |

\* cited by examiner

*Primary Examiner* — Qun Shen
(74) *Attorney, Agent, or Firm* — Lorenz & Kopf, LLP

(57) ABSTRACT

A method of three-dimensional geofencing includes defining a virtual boundary in a three-dimensional geographical space, the virtual boundary including lateral position parameters and an altitude parameter. A boundary-related event and an action to be triggered based on the position of a trackable object is defined with respect to the virtual boundary. The position of the trackable object is estimated based on lateral position values and an altitude value associated with the trackable object. The action is performed if it is determined that the position of the trackable object triggers the boundary-related event.

16 Claims, 5 Drawing Sheets

METHODS AND APPARATUS FOR ALTITUDE-BASED GEOFENCING

TECHNICAL FIELD

The following discussion generally relates to locationing systems. More particularly, the following discussion relates to improved systems and methods for geofencing utilizing altitude (i.e., height) data.

BACKGROUND

Recent years have seen an increase in the use of "geofencing," that is, the use of global positioning system (GPS) data and other such position-related data to define a virtual boundary in two-dimensional space. One or more events can then be triggered (e.g., by a central server or other central control unit) when a user (and/or mobile device carried by the user) enters or exits the virtual boundary. For example, a hospital may utilize geofencing to determine whether a patient has left a virtual boundary defined by the perimeter of a hospital structure, or a retailer might utilize geofencing to provide an electronic coupon to a user when that user enters a virtual boundary defined by the exterior of a shopping mall.

Currently known geofencing systems are unsatisfactory in a number of respects, however. For example, prior art geofencing techniques are generally two-dimensional (i.e., are defined within a planar map) and thus do not comprehend an altitude, height, or "z-axis" attribute. As a result, such systems are not capable of determining, for example, whether a user is actually located within an apartment complex or other tall structure. Furthermore, other home automation and security tasks are less effective, as they are not able to determine whether a user has changed floors within a home.

It is therefore desirable to create improved systems, devices and processes for accurately determining the location of a user and/or mobile device in three dimensions. These and other desirable features and characteristics will become apparent from the subsequent detailed description and the appended claims, taken in conjunction with the accompanying drawings and this background section.

BRIEF SUMMARY

According to various embodiments, an estimate of the altitude (or "z-axis" value) of a trackable object (e.g., a mobile device or other object) is utilized to define boundary-related events associated with a three-dimensional virtual boundary (e.g., a "geosphere"). In this way, three-dimensional geofencing can be accomplished.

In accordance with one embodiment, a method of three-dimensional geofencing includes defining a virtual boundary in a three-dimensional geographical space, the virtual boundary including lateral position parameters and an altitude parameter. A boundary-related event and an action to be triggered based on the position of a trackable object is defined with respect to the virtual boundary. The position of the trackable object is estimated based on lateral position values and an altitude value associated with the trackable object. The action is performed if it is determined that the position of the trackable object triggers the boundary-related event.

In accordance with another embodiment, a three-dimensional geofencing system includes a trackable object and a computing device remote from the trackable object. The computing device including a processor and a memory, the memory including software instructions configured to cause the processor to: define a virtual boundary in a three-dimensional geographical space, the virtual boundary including lateral position parameters and an altitude parameter; define a boundary-related event and an action to be triggered based on the position of a trackable object with respect to the virtual boundary, and estimate the position of the trackable object based on lateral position values and an altitude value associated with the trackable object.

Many other example embodiments and modifications to these examples are set forth below.

BRIEF DESCRIPTION OF THE DRAWING FIGURES

Example embodiments will hereinafter be described in conjunction with the following drawing figures, wherein like numerals denote like elements, and FIG. 1 is a conceptual isometric view of an example prior art two-dimensional virtual boundary used in connection with traditional geofencing;

DETAILED DESCRIPTION

In general, the subject matter described herein relates to an improved geofencing system that incorporates altitude data, and is thus three-dimensional in nature. As will be detailed below, such a system provides distinct advantages in both home and commercial contexts. In that regard, the following detailed description of the invention is merely exemplary in nature and is not intended to limit the invention or the application and uses of the invention. Furthermore, there is no intention to be bound by any theory presented in the preceding background or the following detailed description.

Figure 1:
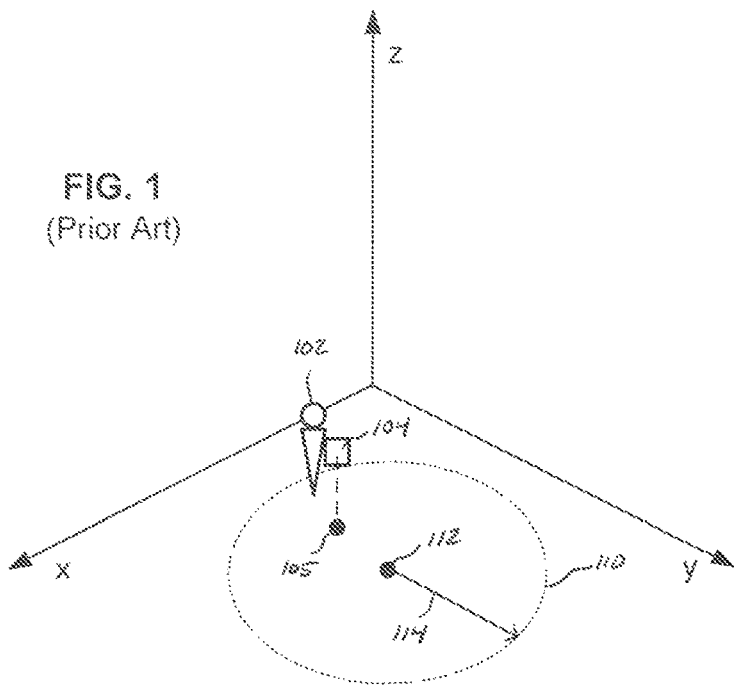

As mentioned briefly above, traditional geofencing systems utilize an exclusively two dimensional virtual boundary. Referring to FIG. 1, for example, one such traditional system might be defined within a geographical Cartesian space defined by the x, y, and z axes, as shown. As a preliminary matter, the terms "z-axis", "altitude", and "height" are used in a generally synonymous manner herein, with the x-y plane generally corresponding to some reference or ground plane. It will be appreciated, however, that in real-world conditions GPS and other positional data generally relate to coordinates (such as latitude and longitude) on a spheroid or the like. The simplified graphical examples shown herein are thus not intended to be limiting.

With continued reference to FIG. 1, prior art geofencing techniques typically track the position of a trackable object (or simply "object") 104 carried or otherwise co-located with a user 102 with respect to a virtual boundary 110 (in this case defined by a center 112 and a radius 114). Since the illustrated system is exclusively two-dimensional, the position of object 104 is denoted by reference numeral 105 (within the x-y plane), without any associated altitude value. Thus, any geofencing system utilizing virtual boundary 110 will only be able to trigger certain events based on the projection of object 104 within the x-y plane, as shown.

Figure 2:
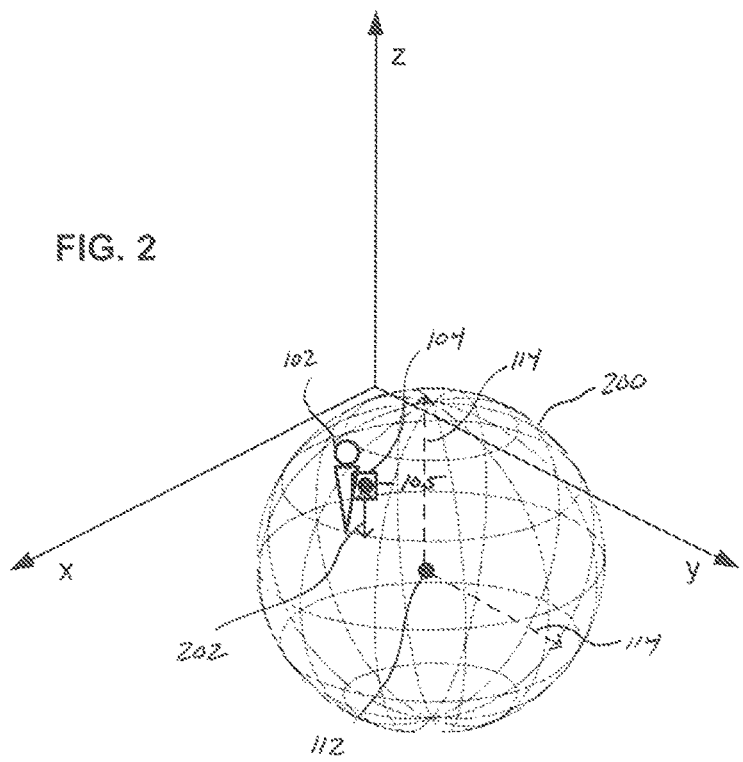
FIG. 2 is a conceptual isometric view of a three-dimensional virtual boundary in accordance with one embodiment.

In contrast, referring to FIG. 2, an altitude-based geofencing system in accordance with one embodiment is capable of defining a three-dimensional virtual boundary 200, in this case a spheroid or "geosphere" shape defined by a center 112 and a radius 114. In this way, the altitude (i.e., z-axis value) 202 can be determined, as described in further detail below.

Figure 3:
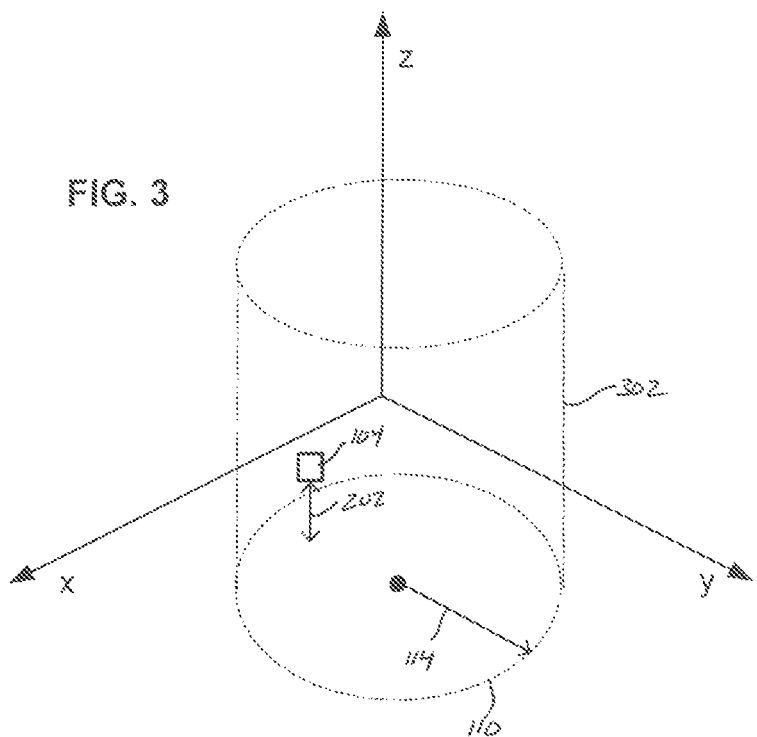
FIG. 3 is a conceptual isometric view of a three-dimensional virtual boundary in accordance with another example embodiment.
Figure 4:
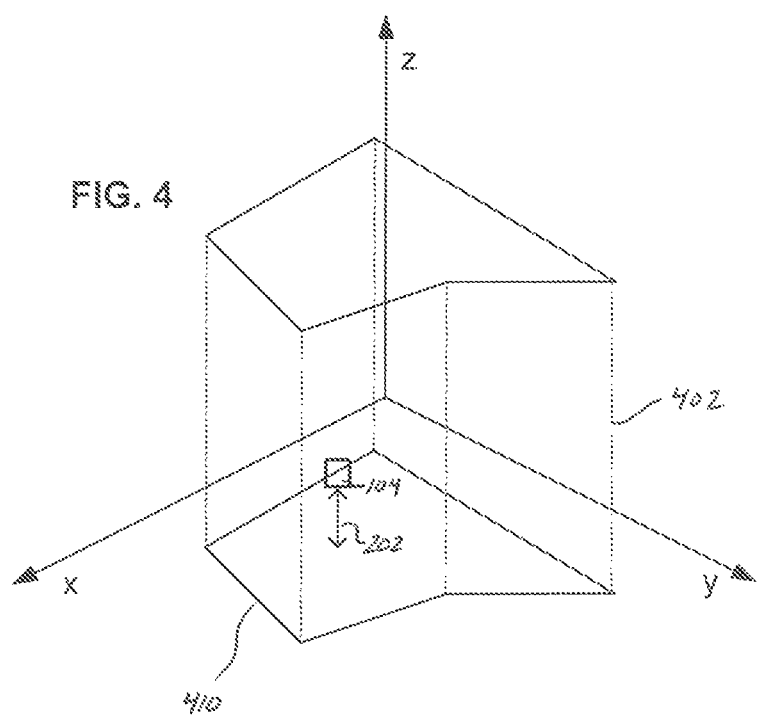
FIG. 4 is a conceptual isometric view of a three-dimensional virtual boundary in accordance with another example embodiment.

While FIG. 2 illustrates a spherical virtual boundary 200, depending on the application any desired three-dimensional boundary may be defined. Referring to FIG. 3, for example, virtual boundary 302 is generally cylindrical, having a substantially circular and planar base (110) projected upward parallel to the z-axis by a predetermined distance. FIG. 4 shows yet another example in which the base boundary is a polygon 410 that is similarly projected upward along the z-axis to form a virtual boundary 402 as shown. In general, the virtual boundary may be any arbitrary three-dimensional shape in which trackable object 104 may be located.

The term "trackable object" as used herein refers to any device, component, or physical object (which may or may not incorporate active electronic components) that is capable of estimating its own position (including altitude) or cooperates with some other, remote computing device that determines the position of the trackable object. Stated another way, the task of determining the location of the trackable object with respect to the virtual boundary may be distributed between both the remote computing device and the trackable object in any desired manner. The various embodiments described herein are not intended to be limiting.

In some embodiments, the trackable object is a smartphone, feature phone, tablet device, laptop computer, or other mobile device incorporating various wireless communication functionality and sensors (such as accelerometers, altimeters, GPS components, barometers, compass components, etc.). In other embodiments, the trackable object is simply some physical object carried by a user (or is otherwise mobile) and which can be tracked via an external computing device (e.g., an RFID chip that can be sensed by a nearby RFID reader). In general, trackable objects may incorporate any form of IEEE 801.11 (e.g., "WiFi") protocols, any form of IEEE 802.15 (e.g., "BLUETOOTH" IEEE 802.15.1 or "ZIGBEE" IEEE 802.15.4 protocols) or the like, although other embodiments could use any open, standard or non-standard protocols and frequencies, including any protocols that are later developed.

Figure 5:
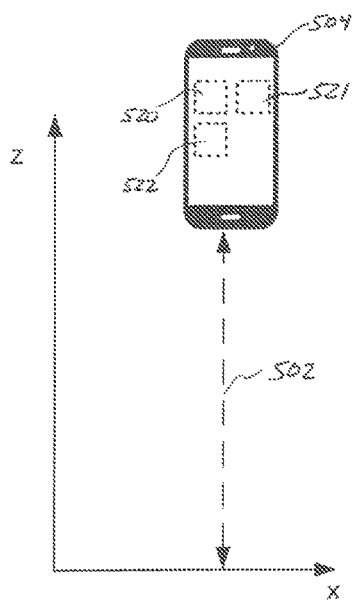
FIG. 5-8 show various embodiments for estimating the altitude (z-axis value) of a trackable object with respect to various reference locations.

FIGS. 5-8 depict just a few examples of how the position of a trackable object (object 504 in the figures) may be estimated. In FIG. 5, for example, object 504 includes an altimeter module 520, an altimeter module 521, and or an accelerometer module 522. Using one or more of these modules, the altitude 502 may be estimated as is known in the art. Furthermore, the velocity and/or acceleration of object 504 may be estimated using, for example, accelerometer module 522. Knowledge of the velocity and/or acceleration may be used to further refine the events that might trigger an action with respect to the virtual boundary.

Figure 6:
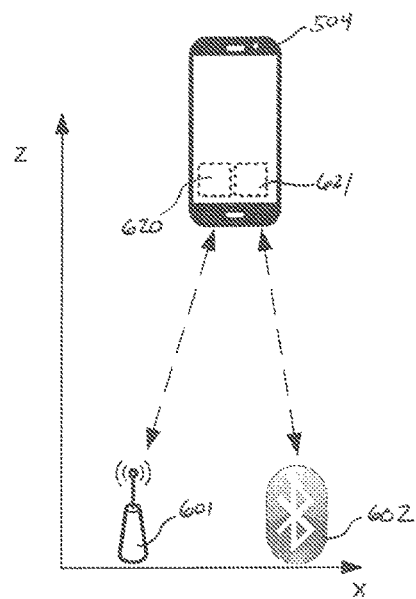

FIG. 6 depicts another example in which a WiFi (802.11-based) access point 601 and/or Bluetooth device 602 are used to communicate with respective WiFi and Bluetooth modules 620 and 621 within object 504. In this way, the strength of the connection(s) between respective components may be used to estimate a distance, and therefore altitude. For example, the received signal strength indicator (RSSI) resulting from the connection between access point 601 and object 504 may be used to estimate distance. Similarly, the signal strength between Bluetooth device 602 and object 504 may be used to estimate the distance (i.e., altitude) of object 504. The embodiments shown in FIG. 6 are particularly advantageous in that they employ components that are found in many households already, namely, WiFi access points and Bluetooth devices.

Figure 7:
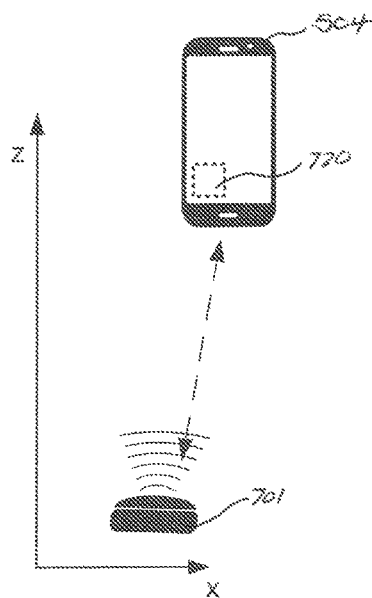

FIG. 7 depicts another embodiment in which an RFID reader 701 is present within the embodiment and is configured to activate and receive data from a corresponding RFID component 720 within object 504. In some contexts, multiple RFID readers 701 may be present within the environment (e.g., near entrances/exits). The estimation of distance based on RFID signals is well known in the art, and need not be discussed in detail herein.

Figure 8:
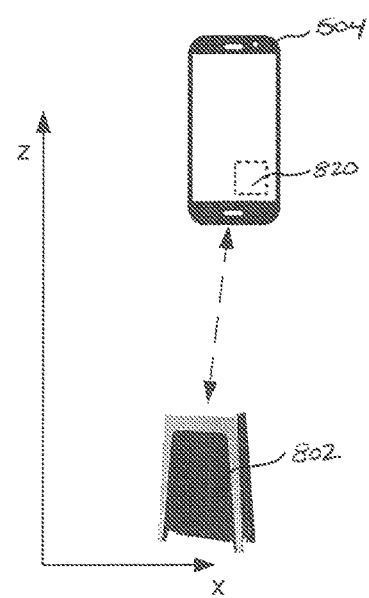

FIG. 8 illustrates yet another embodiment in which a "small cell", "femtocell", or other cellular network component (such as a mobile base station) 802 is incorporated into the environment and interacts with the cellular (e.g., 3G, 4G, etc.) module 820 incorporated into object 504. Utilizing the signal strength between module 820 and object 504, the distance (i.e., altitude) may be estimated.

Figure 10:
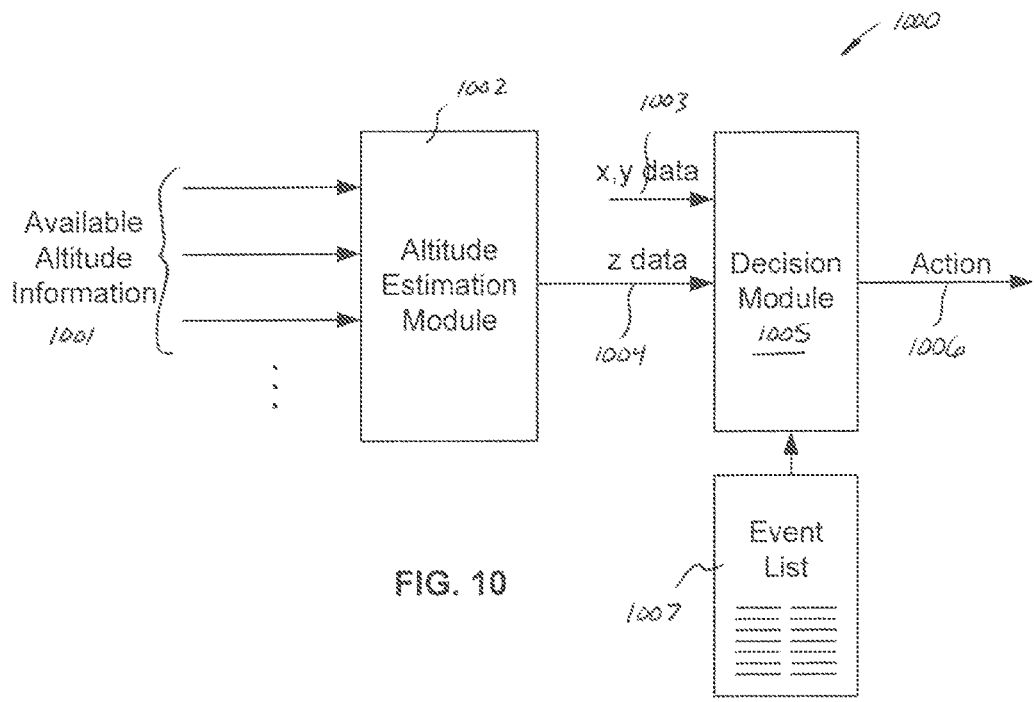
FIG. 10 is a conceptual block diagram in accordance with one embodiment.

FIG. 10 is a conceptual block diagram that illustrates, in modular form, operation of a geofencing system in accordance with various embodiments. It will be appreciated that the illustrated blocks may be implemented using any combination of hardware (e.g., microprocessors, ASICs, FPGAs, discrete components, etc.) and/or software.

In general, available altitude information 1001 (e.g., from one or more of the components shown in FIGS. 5-8) is provided to an altitude estimation module 1002, which determines an altitude (z-value) estimate 1004. For example, weights and/or confidence levels may be associated with each of the inputs to determine an optimal estimate. In parallel, conventional two-dimensional positioning data (e.g., GPS data) 1003 is determined and provided to decision module 1005 along with altitude data 1004. Using a predefined event list 1007 that includes a list of events, such as a trackable object crossing the virtual boundary, and associated actions, decision module 1005 determines which, if any, action 1006 should occur (e.g., an alarm or notification, etc.).

Figure 11:
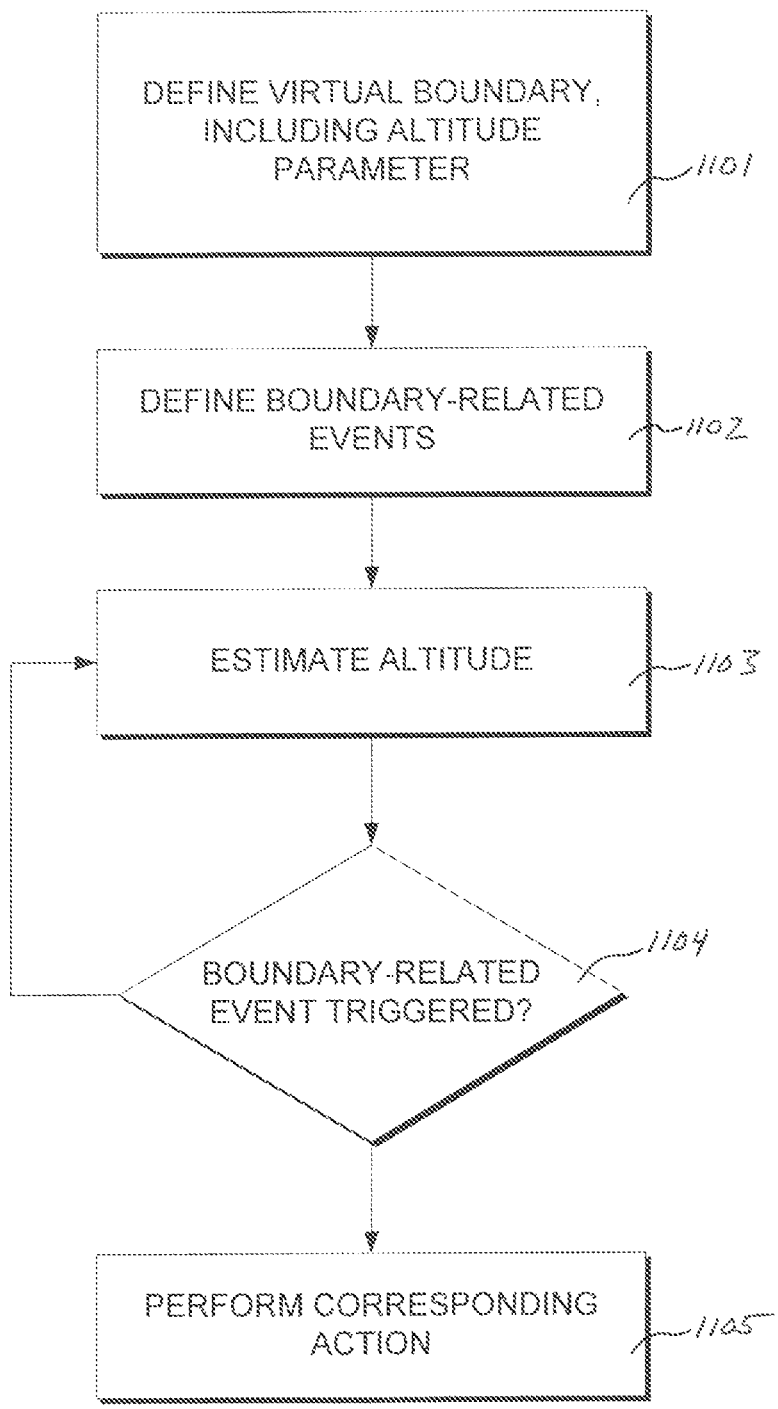
FIG. 11 is a flow chart illustrating a method in accordance with one embodiment.

FIG. 11 illustrates, in simplified form, a geofencing method in accordance with one embodiment. First, in step 1101, a virtual boundary is defined in such a way that it includes an altitude (z-axis) parameter. Stated another way, a virtual boundary is defined in a three-dimensional geographical space, wherein the virtual boundary includes lateral position parameters (e.g., lat./long.) and an altitude parameter—i.e., meters above sea level or a distance in meters from a central point (x, y, z). In addition, vertical velocity and/or acceleration may be utilized in defining the boundary conditions.

Defining the boundary may be accomplished by a user (using an appropriate user interface) operating a computing device or the trackable object itself. In one embodiment, the user defines the boundary explicitly using position and range values. For example, a central point (x, y, z) and a distance from that point (r) may be defined. In another embodiment, the present location of the trackable object is defined as the center or another point to be used in defining the virtual boundary (e.g., a vertex on a polygon defining the boundary). In one example, the current location of the trackable object is set as the z-distance for a boundary (e.g., first floor, second floor, etc.).

In step 1102, the boundary-related events (event list 1007 in FIG. 10) are defined, along with the action to be performed upon occurrence of those events. That is, this step includes defining a boundary-related event and an action to be triggered based on the position of a trackable object with respect to the virtual boundary. Events might include, for example, the trackable object leaving the virtual boundary, entering the virtual boundary, exceeding a particular velocity/acceleration, etc. Various examples of boundary-related events are further discussed below.

In step 1103, the altitude of the trackable object is estimated. As previously described (e.g., in conjunction with FIGS. 5-8), this may accomplished in a variety of ways using both the trackable object and a remote computing device. In general, this step includes estimating the position of the trackable object based on lateral position values and an altitude value associated with the trackable object.

Next, in step 1104, the system determines whether the boundary-related event has been triggered. This may be determined by the trackable object, the remote computing device, or both. The system then performs the appropriate action if it is determined that the position of the trackable object triggers the boundary-related event (step 1105).

Having thus described various systems and methods in accordance with various embodiments, a number of example use-cases will now be described.

Figure 9:
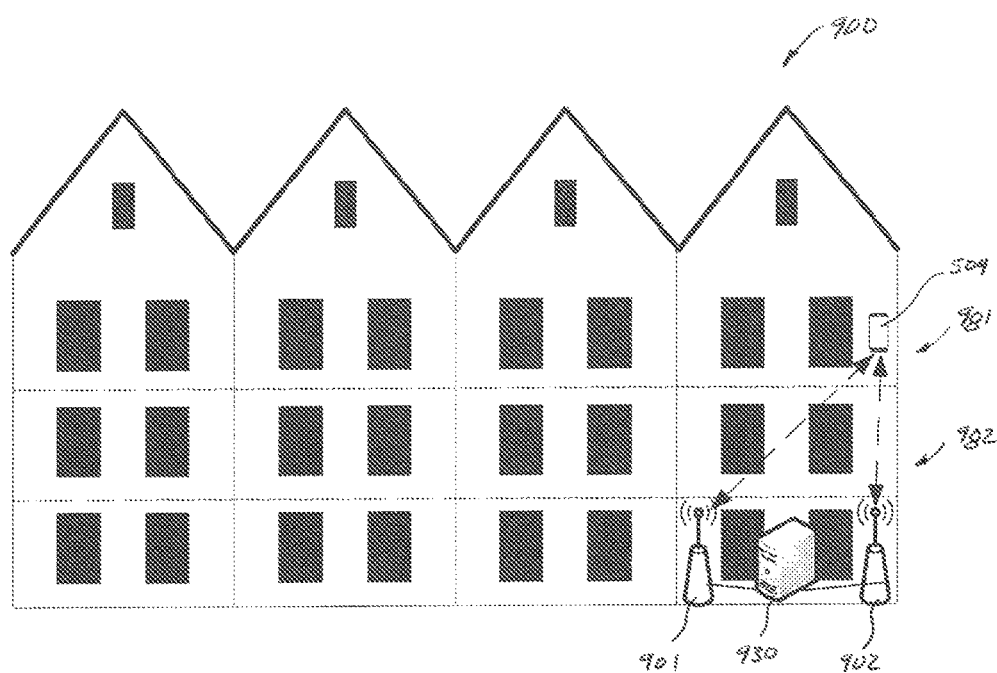
FIG. 9 illustrates an example structure in which various embodiments may be employed.

FIG. 9 depicts an example residential or commercial structure 900 useful in describing various examples. As shown, structure 900 includes multiple (i.e., 3) stories, or "floors", including a first floor, a second floor 982, and a third floor 981 having corresponding rooms, doors, stairways, etc. (not illustrated in the interest of clarity). A computing device 930 is located within structure 900 (e.g., on the first floor), as well as two access points 901 and 902, as illustrated. As will be appreciated, structure 900 might also include any of the components described and shown in FIGS. 5-8.

One advantage of the subject matter described herein relates to advanced home automation and security features. For example, as shown in FIG. 9, the system might determine whether a trackable object 504 (carried by a user, not illustrated) is on the third floor 981 or 982, and act accordingly. In the context of a multi-tenant apartment building, for example, the system might determine whether the user is home/away based on his or her current floor. In such a case, the action to be taken might include automatically locking doors, turning on/off appliances, setting a thermostat, or otherwise modifying the environment of the user's residence based on the altitude information determined by the system.

The present system also provides advantages in the field of safety. For example, in the event that acceleration is sensed, a warning message may be generated (e.g., via object 504 or computing device 930) in the event that the acceleration in the vertical direction exceeds some predetermined threshold value (e.g., indicating that the user has fallen from a window or, in other contexts, has fallen during climbing). In another embodiment, first responders may use altitude data to determine which floor (e.g., 981 or 982) the user is on during an emergency situation, such as during a fire. A number of other rescue situations might also utilize altitude-based geofencing, such as locating an individual deep sea diving, locating the victim of an avalanche, finding missing children in a large structure such as a mall or cruise ship, and similar scenarios.

Further advantages are provided in commercial settings. For example, determining the location of a underground workers (e.g., in sewers and subways), above ground workers (e.g., utility pole repair), or the like.

In an entertainment context, a message or notification (such as a social media photo/text) may automatically be sent to one or more individuals or groups when a user is in the air (e.g., hang gliding) or below ground (e.g., diving or spelunking).

The various processes, devices and systems described herein may be readily adapted for any number of equivalent environments and applications. The above examples are not meant to be limiting.

The term "exemplary" is used herein to represent one example, instance or illustration that may have any number of equivalent alternatives. Any implementation described herein as "exemplary" is not necessarily to be construed as preferred or advantageous over other implementations, but rather as a mere example. While several example embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method of three-dimensional geofencing performed utilizing a user-carried mobile device including a processor, at least one sensor, and a memory containing software instructions executed by the processor, the method comprising:

receiving, via the user-carried mobile device, user input defining a virtual boundary in a three-dimensional geographical space, the virtual boundary including lateral position parameters and an altitude parameter;

further receiving, via the user-carried mobile device, user input defining a boundary-related event and an action to be triggered based on the position of the user-carried mobile device with respect to the virtual boundary;

estimating the position of the user-carried mobile device based on lateral position values and an altitude value associated with the user-carried mobile device, as estimated utilizing the at least one sensor; and performing the action or causing the action to be performed, via user-carried the mobile device, if it is determined that the position of the user-carried mobile device triggers the boundary-related event;

wherein performing comprises causing an environmental aspect of a user residence, which is located in a multistory building, to be modified based at least in part on when the user-carried mobile device is located on a particular floor of the multistory building; and wherein causing an environmental aspect of the user residence to be modified comprises at least one of: (i) causing a door of the user residence to automatically lock, (ii) causing an appliance located in the user's residence to be turned on or off, and (iii) causing a thermostat located in the user residence to change setting.

2. The method of claim 1, wherein estimating the position of the user-carried mobile device comprises determining at least one of the velocity and acceleration of the user-carried mobile device within the three-dimensional geographical space utilizing the at least one sensor;

wherein further receiving comprises further receiving, via the user-carried mobile device, user input defining the boundary-related event based on the velocity and/or acceleration of the user-carried mobile device.

3. The method of claim 1, wherein the virtual boundary is a geosphere defined by a central point and a radius value.

4. The method of claim 1, wherein the virtual boundary is defined by a substantially planar closed curve extending a predetermined height.

5. The method of claim 1, wherein the altitude value is estimated by the processor of the user-carried mobile device based on a received signal strength indicator value derived from a wireless connection between the user-carried mobile device and an access point associated therewith, as estimated utilizing the at least one sensor.

6. The method of claim 1, wherein the at least one sensor comprises at least one of a barometer, an altimeter, and an accelerometer.

7. The method of claim 1, wherein the processor of the user-carried mobile device estimates the altitude value based, at least in part, on radio frequency identification signals received by the at least one sensor.

8. A three-dimensional geofencing system, the system comprising:
a trackable object; and
a computing device including a processor and a memory, the memory including software instructions configured to cause the processor to:
receive, via the computing device, user input defining a virtual boundary in a three-dimensional geographical space, the virtual boundary having a center, lateral position parameters, and an altitude parameter;
further receive, via the computing device, user input defining a boundary-related event and an action to be triggered based on the position of a trackable object with respect to the virtual boundary;
estimate the position of the trackable object based on lateral position values and an altitude value associated with the trackable object; and
perform the action when the computing device determines that the position of the trackable object triggers the boundary-related event;
wherein performing comprises causing an environmental aspect of a user residence, which is located in a multistory building, to be modified based at least in part on when the user-carried mobile device is located on a particular floor of the multistory building; and
wherein causing an environmental aspect of the user residence to be modified comprises at least one of: (i) causing a door of the user residence to automatically lock, (ii) causing an appliance located in the user's residence to be turned on or off, and (iii) causing a thermostat located in the user residence to change setting.

9. The three-dimensional geofencing system of claim 8, wherein the computing device is configured to determine at least one of the velocity and acceleration of the trackable object within the three-dimensional geographical space and to define the boundary-related event based on the velocity and/or acceleration of the trackable object.

10. The three-dimensional geofencing system of claim 8, wherein the virtual boundary is defined by a substantially planar closed curve extending a predetermined height.

11. The three-dimensional geofencing system of claim 8, wherein the altitude value is determined by the trackable object and transmitted to the computing device.

12. The method of claim 1, wherein the altitude value is estimated based at least one of a WiFi received signal strength indicator value and a radio frequency identification signal.

13. The method of claim 1, wherein the altitude value is estimated via at least one of a barometer, an altimeter, and an accelerometer located within the trackable object.

14. Non-transitory computer-readable media including software instructions that cause a processor to perform the steps of:
defining a virtual boundary in a three-dimensional geographical space, the virtual boundary having a center lateral position parameters, and an altitude parameter;
defining a boundary-related event and an action to be triggered based on the position of a trackable object with respect to the virtual boundary;
estimating the position of the trackable object based on lateral position values and an altitude value associated with the trackable object; and
performing the action if it is determined that the position of the trackable object triggers the boundary-related event;
wherein performing comprises causing an environmental aspect of a user residence, which is located in a multistory building, to be modified based at least in part on when the user-carried mobile device is located on a particular floor of the multistory building; and
wherein causing an environmental aspect of the user residence to be modified comprises at least one of: (i) causing a door of the user residence to automatically lock, (ii) causing an appliance located in the user's residence to be turned on or off, and (iii) causing a thermostat located in the user residence to change setting.

15. The method of claim 1, further comprising:
when defining the virtual boundary in the three-dimensional geographical space, determining a present location of the user-carried mobile device utilizing the at least one sensor; and
utilizing the present location of the user-carried mobile device to define the center of the virtual boundary.

16. The method of claim 1, further comprising:
when defining the virtual boundary in the three-dimensional geographical space, determining a present location of the user-carried mobile device utilizing the at least one sensor; and
utilizing the present location of the user-carried mobile device to define a vertex on a polygon defining the virtual boundary.

* * * * *